(12) United States Patent
Hu et al.

(10) Patent No.: US 12,431,708 B1
(45) Date of Patent: Sep. 30, 2025

(54) METHOD FOR PREDICTING DISTRIBUTED REGIONAL GENERATED POWER BASED ON STACKED INTEGRATED MODEL

(71) Applicant: UNIV HANGZHOU NORMAL, Hangzhou (CN)

(72) Inventors: Keyong Hu, Hangzhou (CN); Chunyuan Lang, Hangzhou (CN); Zheyi Fu, Hangzhou (CN); Ben Wang, Hangzhou (CN); Yang Feng, Hangzhou (CN); Shuifa Sun, Hangzhou (CN)

(73) Assignee: UNIV HANGZHOU NORMAL, Hangzhou (CN)

( * ) Notice: Subject to any disclaimer, the term of this patent is extended or adjusted under 35 U.S.C. 154(b) by 0 days.

(21) Appl. No.: 19/194,270

(22) Filed: Apr. 30, 2025

(30) Foreign Application Priority Data

Jun. 25, 2024 (CN) .......................... 202410828162.8

(51) Int. Cl.
  *H02J 3/00* (2006.01)
  *G06N 3/0442* (2023.01)
  *G06N 3/045* (2023.01)
  *G06N 3/0464* (2023.01)

(52) U.S. Cl.
  CPC ............ *H02J 3/004* (2020.01); *G06N 3/0442* (2023.01); *G06N 3/045* (2023.01); *G06N 3/0464* (2023.01); *H02J 2203/20* (2020.01)

(58) Field of Classification Search
  CPC .... H02J 3/004; H02J 2203/20; G06N 3/0442; G06N 3/045; G06N 3/0464
  See application file for complete search history.

(56) References Cited

PUBLICATIONS

Akhter, Kazi Fuad Bin, et al. "Short-term electricity demand forecasting of dhaka city using cnn with stacked bilstm." arXiv preprint arXiv:2406.06651 (2024). (Year: 2024).*
Gu, Sili, et al. "Multi-task transient stability assessment of power system based on graph neural network with interpretable attribution analysis." Energy Reports 9 (2023): 930-942. (Year: 2023).*
Niu, Dongxiao, et al. "Short-term multi-energy load forecasting for integrated energy systems based on CNN-BiGRU optimized by attention mechanism." Applied Energy 313 (2022): 118801. (Year: 2022).*
Ahmad, Maqbool, et al. "Machine And Deep Learning Base Stacking Model Using Hybrid Class Imbalanced Technique For Electricity Theft Detection In Smart Grid." Available at SSRN 4755076. (Year: 2024).*
Wu, Bo, and Yifan Hu. "Analysis of substation joint safety control system and model based on multi-source heterogeneous data fusion." IEEE Access 11 (2023): 35281-35297. (Year: 2023).*

* cited by examiner

*Primary Examiner* — Miranda M Huang
*Assistant Examiner* — Sidney Vincent Bostwick
(74) *Attorney, Agent, or Firm* — JEEN IP LAW, LLC

(57) ABSTRACT

A method for predicting distributed regional generated power based on a stacked integrated model is provided. The predicting method takes the CNN network and the LSTM network as the basic models, and combines the multi-head-attention mechanism to carry out weighted fusion of comprehensive features, and the meta-model adopts the GRU network.

9 Claims, 6 Drawing Sheets

METHOD FOR PREDICTING DISTRIBUTED REGIONAL GENERATED POWER BASED ON STACKED INTEGRATED MODEL

CROSS-REFERENCE TO RELATED APPLICATIONS

This application claims priority to Chinese Patent Application No. 202410828162.8, filed on Jun. 25, 2024, the contents of which are hereby incorporated by reference.

TECHNICAL FIELD

The disclosure belongs to the technical field of photovoltaic prediction of new energy power generation, and particularly relates to a method for predicting distributed regional generated power based on a stacked integrated model.

BACKGROUND

It is estimated that by 2050, the global population will reach 9.6 billion, which will further increase the global demand for energy and promote the substantial growth of power production around the world. According to the statistics of China National Energy Administration, the total installed capacity of grid-connected wind power and solar power generation in China has continuously exceeded 800 million kilowatts, 900 million kilowatts and 1 billion kilowatts from 760 million kilowatts at the end of 2022, and reached 1.05 billion kilowatts by the end of 2023, accounting for 36% of the total installed capacity, up 6.4 percentage points year-on-year. The installed capacity of grid-connected solar power generation will increase from 390 million kilowatts at the end of 2022 to 610 million kilowatts at the end of 2023. Among them, distributed photovoltaic power generation has entered a period of rapid industrial development in recent years. Data show that in 2021, the newly installed capacity of distributed photovoltaic power generation in China surpassed that of centralized photovoltaic power generation for the first time, and distributed photovoltaic power generation increased by 29.28 million kilowatts, accounting for about 55% of all newly installed photovoltaic power generation. In 2022, distributed development became the main way of wind power photovoltaic development, and the new installed capacity of distributed photovoltaic was 51.11 million kilowatts, accounting for more than 58% of the new installed capacity of photovoltaic in that year. By the end of September 2023, the cumulative installed capacity of household distributed photovoltaics in China exceeded 100 million kilowatts, reaching 105 million kilowatts. With the increasing proportion of distributed photovoltaic installations, the random fluctuation and non-stationarity of photovoltaic power generation caused by complex weather and other factors are becoming stronger and stronger, which fundamentally threatens the security of the power grid, and seriously hinders the ability of real-time data collection, perception and processing, realizes the considerable, measurable, adjustable and controllable mass resources, and improves the cooperative interaction ability between power supply, energy storage and load and power grid. According to the statistics of China National Energy Administration (NEA), photovoltaic power generation capacity reached 325.9 billion kWh, up 25.1% year-on-year. The utilization rate of photovoltaic power generation reached 98.0%, but the waste of solar energy was about 6.52 billion kWh. Therefore, it is urgent to improve the accuracy of regional photovoltaic power prediction. By accurately predicting the total power of regional photovoltaic power generation, it can help to plan and dispatch energy supply, ensure adequate supply and reasonable distribution of energy, and thus improve the reliability and stability of power grid.

There are three main methods for predicting regional generated power: superposition method, extrapolation method and statistical upscaling method. Among them, the superposition method is to predict the power of all single photovoltaic power stations in the whole large region, and then directly add them to obtain the regional predicting results. This method is very simple to implement, but the problem is also very obvious. The number of photovoltaic power stations in a large region is very large. If there is a big error in the prediction process of one of the power stations, the error will gradually increase in the accumulation process, and each of the power stations is distributed in different regions, which also leads to different features, so it is necessary to build features for each of the power stations, which leads to a lot of workload. The extrapolation method first divides the distributed photovoltaic power station in the whole region into several sub-regions. Secondly, the historical data most similar to the current irradiance is selected as the matching object, and the output value of each of the sub-regions is predicted. Finally, the output value of the whole region is obtained by summing the output values of each of the sub-regions. Statistically speaking, the scaling rule is to divide a large region into multiple sub-regions, select the most representative power station among multiple power stations in the sub-regions, and then predict the power of each representative power station respectively. Finally, according to the proportion of the reference photovoltaic power station power generation in the photovoltaic power station group in each of the sub-regions, the regional photovoltaic power generation capacity is obtained.

Compared with the superposition method and extrapolation method, the scale method is statistically more accurate, but when selecting the representative power station, only the correlation between the representative power station and the total regional power is considered, while the spatial correlation between the representative power station and other power stations in the sub-regions is ignored, which also leads to the underutilization of the data of other power stations and limits the improvement of prediction accuracy. For example, in a sub-region, each of the power stations has different capacity and installed scale, or the geographical location and environmental conditions of each of the power stations may lead to uneven distribution of resources, then power stations with large capacity and power stations occupying resource-rich regions will have obvious advantages in the calculation of correlation, but the representative power stations selected by this method may not well represent the whole sub-region. Because this ignores the spatial correlation between the representative power station and other power stations in the sub-region. Each of the power stations may have different positions and relationships in space, and these relationships have an important impact on the power features of the whole sub-region. The method of only considering the power correlation of the total region may not capture this spatial correlation, which leads to the selected representative power station not fully reflecting the features of the whole sub-region.

Compared with the superposition method and extrapolation method, the statistical scale method is more suitable for regional photovoltaic power prediction, but because different photovoltaic power stations may be affected by different environmental conditions and other factors, the selected reference photovoltaic power station may not fully represent the features and changes of all photovoltaic power stations in the whole sub-region; at the same time, the operation and maintenance of photovoltaic power plants may lead to the change of power generation capacity between different power plants, and the proportion of power generation of benchmark photovoltaic power plants may change with time, which will affect the estimation of the proportion of benchmark photovoltaic power plants. In addition, extrapolating the photovoltaic power generation of the whole region according to the proportion cannot combine the space-time features and synergistic effects between sub-regions, which leads to inaccurate prediction.

SUMMARY

The accuracy of large region photovoltaic power prediction is very important for energy planning and operation management. In order to ensure reliable energy supply and effective operation decision, it is necessary to use a more accurate model to predict large region photovoltaic power. On the basis of a statistical scale method, a large region is divided into multiple sub-regions, and in order to better capture the shared features and similarity relationship between the sub-regions, the disclosure adopts a combined model based on a stacked integrated model to predict the photovoltaic generated power of the large region.

In a first aspect, the disclosure provides a method for predicting distributed regional generated power based on a stacked integrated model, including the following steps:

step 1, dividing a predicted region into multiple sub-regions; using historical data of power stations in the predicted region as a data set; the historical data includes a generated power x of each of the power stations, a total generated power of the sub-regions, a total generated power of the predicted region and multiple influence features H;

step 2, according to a degree of correlation with power output, selecting one or more key features h from the influence features H;

step 3, performing a normalization processing on the generated power x of the power stations, the total generated power of the sub-regions, the total generated power of the predicted region and the key features h; dividing the data set after the normalization processing into a training set and a test set;

step 4, building the stacked integrated model the stacked integrated model includes a basic model and a meta-model; the basic model takes the key features of a representative power station as input, extracts features through Convolutional Neural Network, (CNN) network and "Long Short-Term Memory, (LSTM) network respectively, and weights and fuses output features of the CNN network and the LSTM network by using a multi-head-attention mechanism; advanced features extracted by the multi-head-attention mechanism are transformed into a predicted total power of the sub-regions of a final predicted output through a fully connected layer; the meta-model adopts Gated Recurrent Unit, (GRU) network; the meta-model takes a predicted total power of each of the sub-regions output by the basic model as input, and a predicted value of a predicted total power of the predicted region as output;

step 5, training the basic model by using the training set, and inputting the test set into a trained basic model to output and obtain a predicted total generated power of the sub-regions; combined with the predicted total generated power output from the basic model, the training set and the test set, jointly training the meta-model;

step 6, selecting the representative power station in each of the sub-regions and obtaining corresponding historical generated power and key parameters; inputting the historical generated power and the key parameters of the representative power station into the basic model to predict a future total generated power of the sub-regions, and inputting a predicted future total generated power of all the sub-regions into the meta-model to predict a future total generated power of the predicted region.

Optionally, in the sixth step, a method of selecting the representative power station in sub-regions is as follows: constructing a graph attention network, (GAT) for each of the sub-regions, and predicting generated power of the power stations of the sub-regions in corresponding time period by inputting the key parameters; comparing the predicted generated power with an actual generated power, and taking a corresponding power station with a smallest error as the representative power station in the sub-region.

Optionally, in the step 1, the influence features H includes multiple features among wind speed, atmospheric temperature, irradiance, wind direction, maximum wind speed, air pressure, temperature of a probe 1 and temperature of a probe 2.

Optionally, in the step 1, abnormal values in the data set are identified and removed by 3-sigma criterion; after removing the abnormal values from the data set, Hermite interpolation method is used to estimate reasonable values at positions corresponding to the abnormal values based on normal values and the corresponding derivative information.

Optionally, in the step 2, the method for selecting the key features is as follows:

MIC correlation coefficient and Pearson correlation coefficient are used to select features respectively; the MIC correlation calculation formula is as follows:

$$MIC_{(x,H)} = \max_{e*f<D} \frac{I(x, H)}{\min(e, f)}$$

where MIC(x,H) is a maximum information coefficient; I(x,H) is mutual information of power x and influence features H; e and f are rows and columns dividing grids respectively; D is a constant, and a value of D is set to 0.6 power of the number of the power stations in the data set;

a correlation calculation formula of the Pearson correlation coefficient is as follows:

$$\rho_{x,H} = \frac{cov(x, H)}{\sigma_x \sigma_H}$$

where $p_{x,H}$ is the Pearson correlation coefficient; cov(x,H) is a covariance of the power x and the influence features H; $\sigma_x$ and $\sigma_H$ are standard deviations of the power x and the influence features H, respectively; and according to calculated Pearson correlation coefficient $p_{x,H}$ and the maximum information coefficient MIC(x, H), selecting the key features h.

Optionally, a method of selecting the key features h is as follows: selecting influence features corresponding to the Pearson correlation coefficient $p_{x,H}$ greater than 0.4 and the maximum information coefficient MIC(x,H) greater than 0.1 as the key features h.

Optionally, in the step 3, the normalization formula is as follows:

$$a' = \frac{a - a_{min}}{a_{max} - a_{min}}$$

where a' is the data after the normalization processing; a is the original data; max is the maximum value in the original data; $a_{min}$ is the minimum value in the original data.

Optionally, in the step 6, a generated power of the predicted region in next 1 h to 5 h is predicted.

Optionally, in the step 3, after normalization, the data set is divided into four seasons: spring, summer, autumn and winter, and a corresponding model is obtained through training.

In a second aspect, the present disclosure provides a computer device, which includes a memory, a processor and a computer program stored in the memory and executable on the processor, where the memory stores the computer program; and the processor executes the aforementioned regional generated power predicting method.

In a third aspect, the present disclosure provides a readable storage medium storing a computer program; and when executed by a processor, the computer program is used to realize the aforementioned regional generated power predicting method.

The disclosure has the following beneficial effects.

First, the disclosure adopts a stacked integrated model to predict the photovoltaic generated power in distributed region, predicts the generated power in sub-regions through the basic model, and uses the output of the basic model as the input of the meta-model to predict the generated power in the predicted region, thus better solving the problem that the traditional predicting method cannot combine the space-time features and the synergistic effect between the sub-regions, and improving the accuracy of the predicting result.

Second, the disclosure takes CNN network and LSTM network as basic models and combines the multi-head-attention mechanism to carry out weighted fusion of comprehensive features, which may not only learn the spatial dependence in the input sequence and capture the local structural features, but also capture the short-term dependence in the sequence, so that the photovoltaic power generation prediction in the sub-regions may be more accurate; at the same time, the meta-model adopts GRU, which avoids the risk of over-fitting, and has efficient calculation performance, sensitivity to rapid changes and short-term patterns, ability to adapt to differences in different regions, and ability to comprehensively consider sub-regional predicting results.

Third, the disclosure adopts the GAT to select a representative power station, so that the power station may better learn the space-time feature information of other power stations in the region and the feature information of the power station itself, and may adaptively model the contributions of different neighboring power stations according to the introduced multi-head-attention mechanism. The power station with the highest prediction accuracy is selected by this method, which may better represent the photovoltaic power generation situation in the whole sub-region.

Fourth, the disclosure provides accurate large region power prediction, which is helpful for power grid operators, energy managers and investors to make accurate decisions, optimize power dispatching and market operation, and realize reliable power supply and energy planning.

DETAILED DESCRIPTION OF THE EMBODIMENTS

Figure 1:
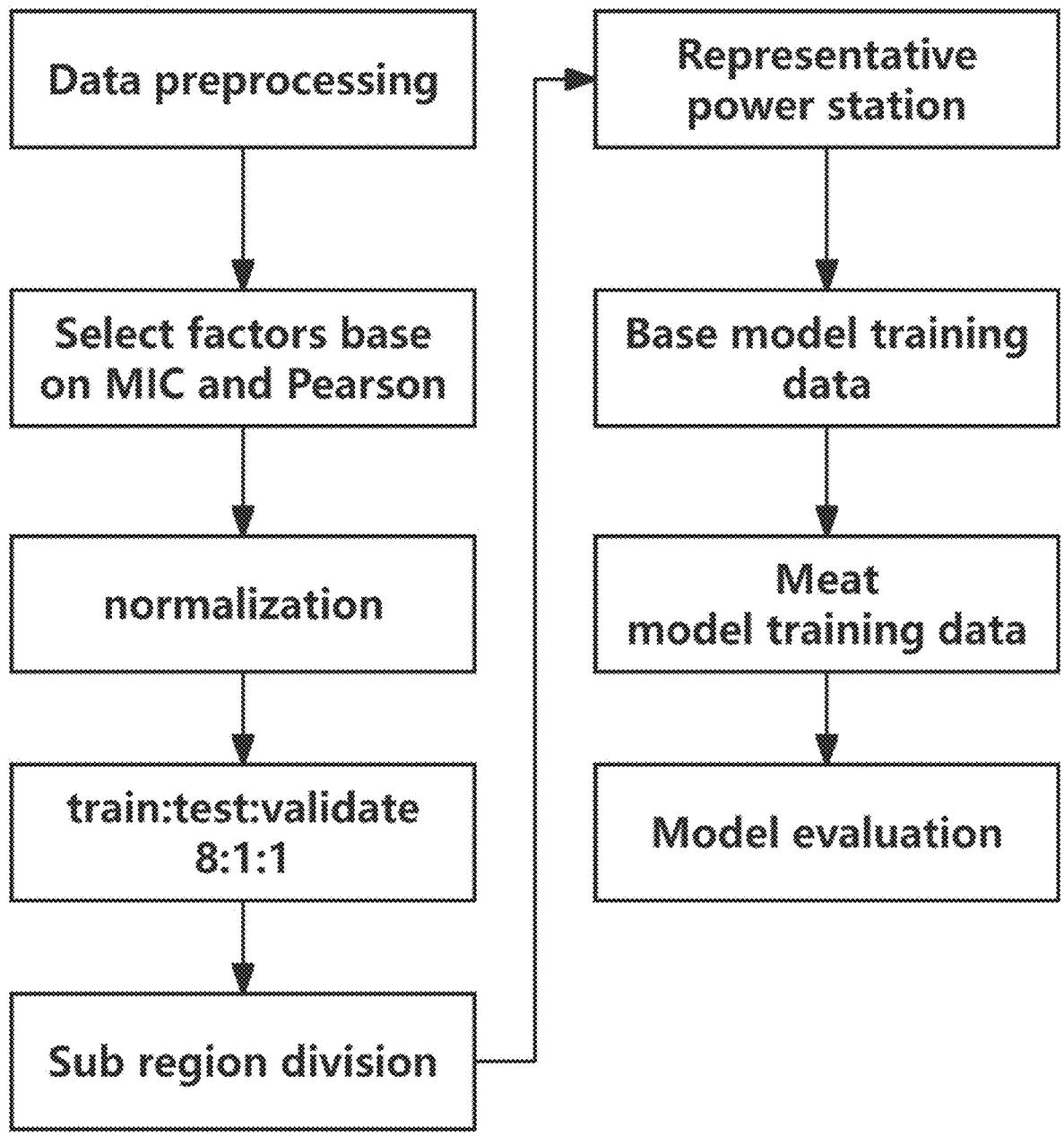
FIG. 1 is a flow chart of photovoltaic generated power prediction of the present disclosure.
Figure 2:
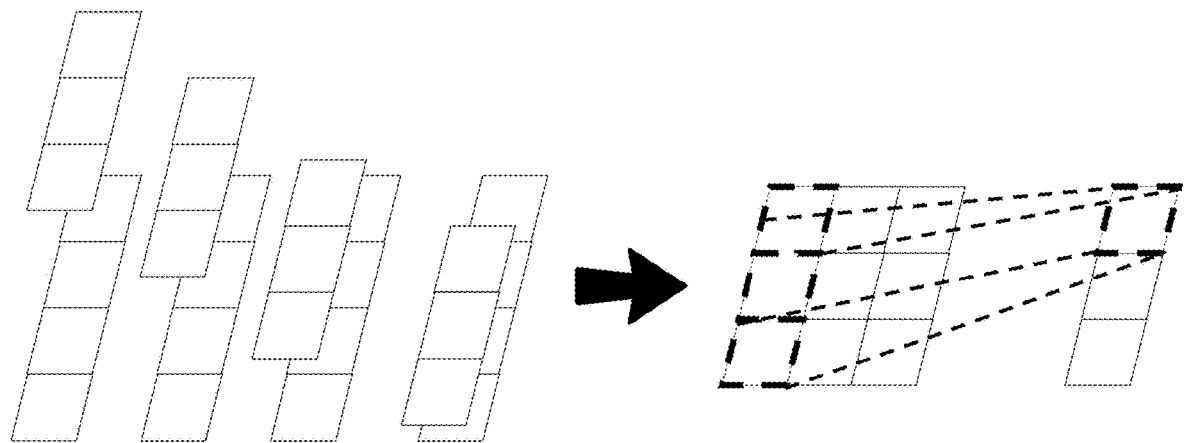
FIG. 2 is a structural model diagram of CNN unit of the present disclosure.
Figure 3:
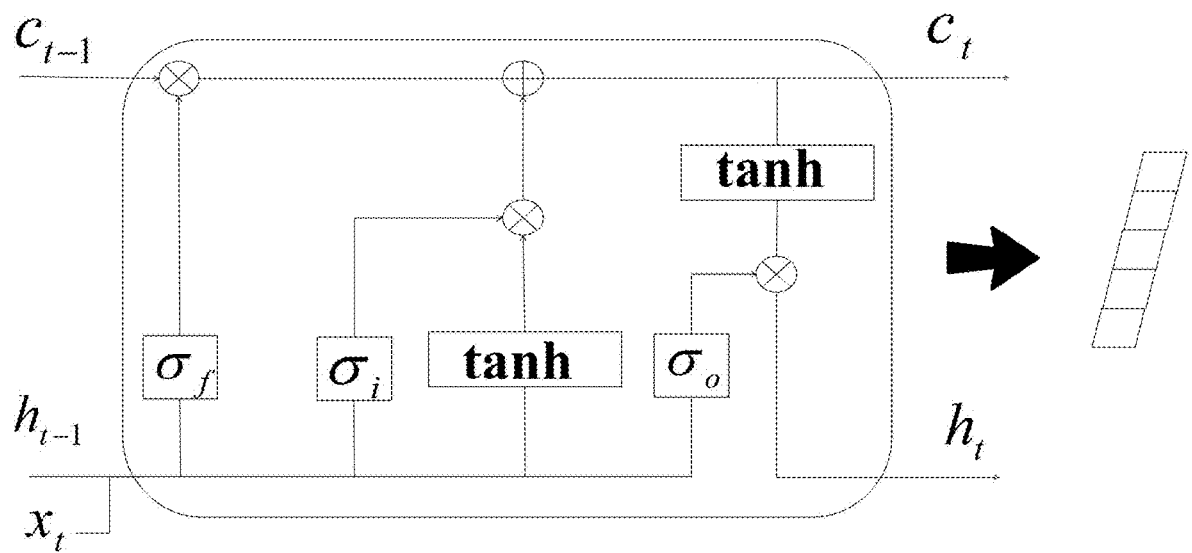
FIG. 3 is a structural model diagram of LSTM unit of the present disclosure.
Figure 4:
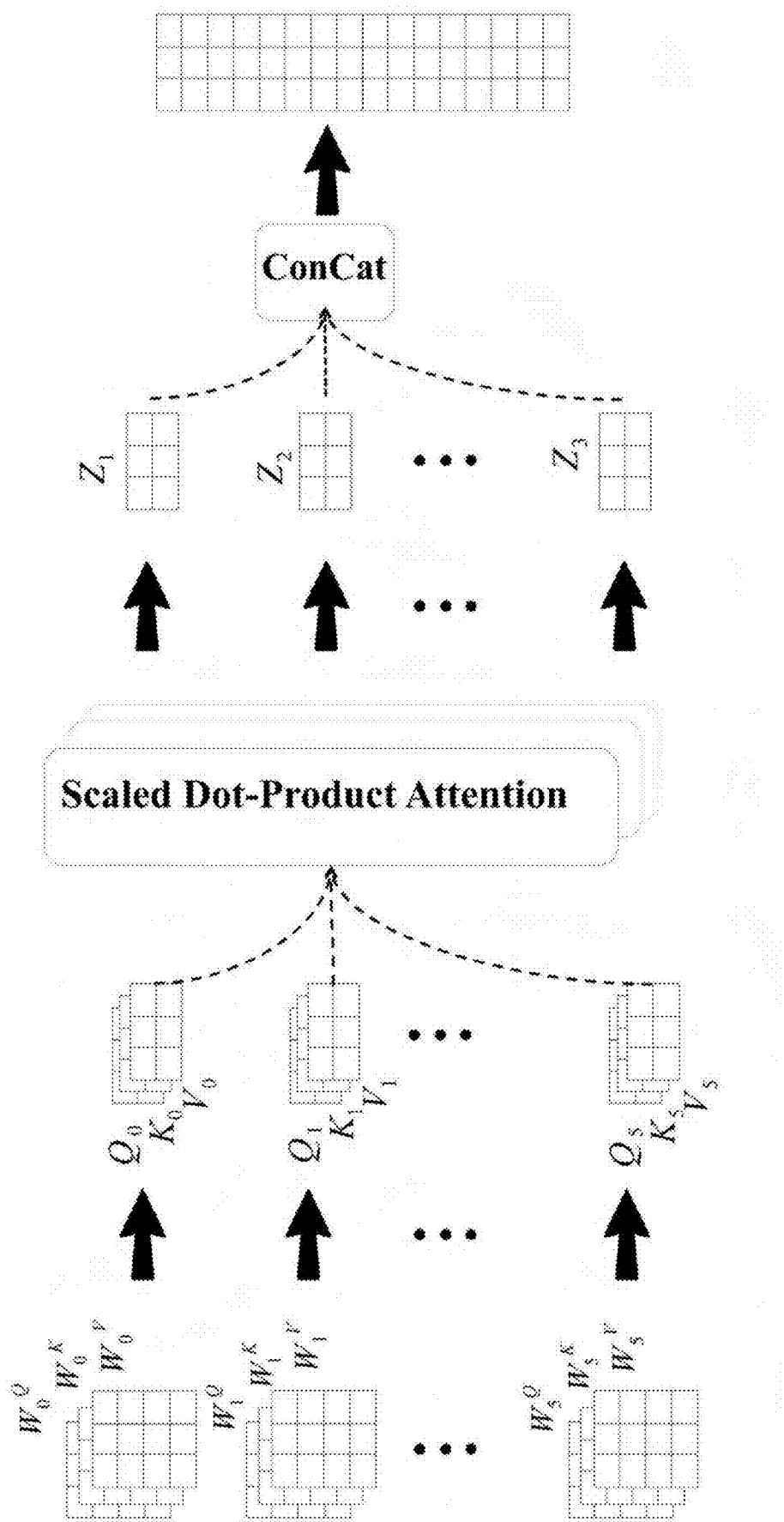
FIG. 4 is a model diagram of multi-head-attention mechanism of the present disclosure.
Figure 5:
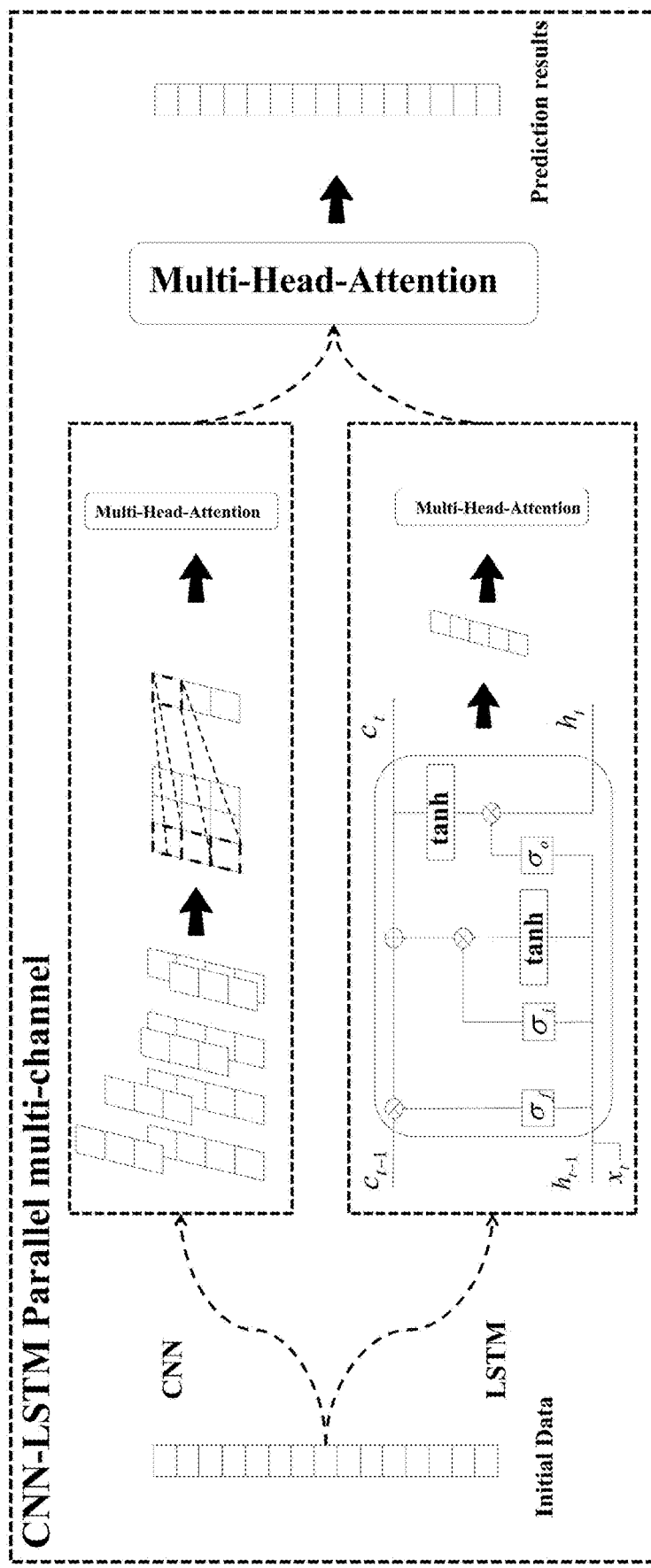
FIG. 5 is a structural diagram of parallel training according to the present disclosure.

The disclosure will be further explained with the attached drawings.

The execution subject of the present embodiment may be a computer device; the computer device comprises a memory and a processor, where an executable code is stored in the memory; when the executable code is executed by the processor, the method described in any one of the embodiments is realized. Specifically, the processor in the computer device processes data sets, selects key features, normalizes, constructs the basic model and meta-model in the stacked integrated model, trains and tests the basic model and meta-model in the stacked integrated model, and uses the basic model and meta-model to process the input data to predict the total generated power in the predicted region.

The memory may include high-speed random access memory (RAM) or non-volatile memory, such as at least one disk memory. The communication connection between the network element of the system and at least one other network element is realized through at least one communication interface (which may be wired or wireless), and the Internet, wide area network, local network, metropolitan area network and the like may be used. The bus may be ISA bus, PCI bus or EISA bus. The bus may be divided into address bus, data bus, control bus.

The memory is used for storing programs, and the processor executes the program after receiving the execution instruction. The method executed by the device defined in the process disclosed in any of the aforementioned embodiments of the present disclosure may be applied to or realized by a processor.

The processor may be an integrated circuit chip with signal processing capability. In the process of implementation, the steps of the above method may be completed by hardware integrated logic circuits or software instructions in the processor. The processor may be a general processor, including a central processing unit (CPU) and a network processor (NP). The processor may also be a digital signal processing (DSP), an application specific integrated circuit (ASIC), a field-programmable gate array (FPGA) or other programmable logic devices, discrete gate or transistor logic devices, and discrete hardware components. The methods, steps and logic blocks disclosed in the embodiments of the present disclosure may be realized or executed. The general processor may be a microprocessor or the processor may be any conventional processor. The steps of the method disclosed in the embodiment of the disclosure may be directly embodied as the completion of execution by a hardware decoding processor, or the completion of execution by a combination of hardware and software modules in the decoding processor. Software modules may be located in random access memory, flash memory, read-only memory, programmable read-only memory or electrically erasable programmable memory, registers and other mature storage media in this field. The storage medium is located in the memory, and the processor reads the information in the memory and combines its hardware to complete the steps of the above method.

In some other embodiments, the computer device may also be one or more desktop computers, Notebook, workstations, databases, and servers.

As shown in FIG. 1, a method for predicting distributed regional generated power based on a stacked integrated model, including the following steps.

Step 1, obtaining and processing a data set.

According to latitude and longitude and geographical location, a large region (predicted region) is divided into several sub-regions. The historical data of power stations in different time periods are used as data sets, and the historical data includes the generated power x of the power stations, the total generated power in the sub-regions, the total generated power in the large region and the influence features H. The influence features H include wind speed, atmospheric temperature, irradiance, wind direction, maximum wind speed, air pressure, temperature of a probe 1 and temperature of a probe 2; the temperature of the probe 1 and the temperature of the probe 2 are used to detect the temperature of the photovoltaic panel. Through the 3-sigma criterion, the abnormal values in the data set are identified and removed. After removing the abnormal values from the data set, Hermite interpolation method is used to estimate the reasonable values at the positions corresponding to the abnormal values based on the normal values and the corresponding derivative information.

Step 2, selecting key features.

Because there are a large number of potential influencing features, it is necessary to select features that are strongly related to power output to reduce the interference of redundant information and noise. Selecting features with high correlation as input can better capture the influencing factors of power and improve the accuracy and interpretability of the prediction of the model. MIC (maximum information coefficient) correlation and Pearson correlation coefficient are used to select features respectively.

MIC correlation, as a nonparametric correlation measurement method, may find any type of variable correlation, including nonlinear relationships, making it possible to find the complex correlation hidden in photovoltaic power generation data and help to find the features strongly related to power output, which is not limited by the hypothesis of feature distribution. The MIC correlation calculation formula is as follows:

$$MIC_{(x,H)} = \max_{e*f<D} \frac{I(x,H)}{\min(e,f)}$$

where MIC(x,H) is the maximum information coefficient; I(x,H) is the mutual information of power x and influence features H; e and f are the rows and columns that divide the grids respectively; D is a constant, and the value of D is set to 0.6 power of the number of power stations in the data set.

Pearson correlation coefficient is a common linear correlation measurement method, which is suitable for measuring the strength of linear relationship. By using the Pearson correlation coefficient, features with high linear correlation with power output may be identified. The correlation calculation formula of the Pearson correlation coefficient is as follows:

$$\rho_{x,H} = \frac{cov(x,H)}{\sigma_x \sigma_H}$$

where $p_{x,H}$ is the Pearson correlation coefficient; cov(x,H) is the covariance of power x and influence feature H; $\sigma_x$ and $\sigma_H$ are the standard deviation of power x and influence features H, respectively.

The influence features corresponding to Pearson correlation coefficient greater than 0.4 and maximum information coefficient greater than 0.1 are selected as the key features H.

In this embodiment, the data set used is the spring data set.

Step 3, normalization processing.

Normalization processing is performed on the generated power x of the power stations, the total generated power of the sub-regions, the total generated power of the large region and the key features h, effectively narrowing the range of the original data, thus better extracting data information and enhancing the correlation between features. The normalization formula is as follows:

$$a' = \frac{a - a_{min}}{a_{max} - a_{min}}$$

where a' is the data after the normalization processing; a is the original data; $a_{max}$ is the maximum value in the original data; $a_{min}$ is the minimum value in the original data.

The data set after the normalization processing is divided into a training set, a test set and a verification set according to the ratio of 8:1:1.

Step 4, building a model for predicting the total generated power of the large region.

Step 4-1, constructing a network for obtaining a representative power station in the sub-regions.

GAT is constructed in each of the sub-regions, and the generated power of the power stations in each of the sub-regions is predicted by inputting the key parameters, and the power station with the best predicting result in the sub-regions is selected as the representative power station in the sub-region. GAT is a model based on graph neural network. In order to better capture the space-time information between related power stations in sub-regions and the feature information of power stations themselves, attention mechanism is introduced between nodes. Compared with the simple average aggregation of neighboring nodes by GCN, GAT learns different attention weights in parallel from different angles and aspects by calculating the attention weights between each node and its neighboring node, and automatically learns the weight of each of the power stations according to the relationships and features between nodes, so as to perform weighted aggregation of the neighboring nodes. This enables GAT to adaptively model the contributions of different nodes to the neighboring nodes and capture the local structure in the graph more flexibly.

Taking the power stations in the sub-regions as the nodes, and taking the key features h={$\vec{h}_1, \vec{h}_2, \ldots, \vec{h}_s$} of the nodes as the input of GAT; where $\vec{h}_i \in R^F$; F is the dimension of the key features; i=1, 2, . . . , s; s is the number of the nodes. The attention coefficient $e_{ij}$ between different nodes i and j is:

$$e_{ij}=a(w\vec{h}_i, w\vec{h}_j)$$

where a is a feedforward neural network; W is the weight matrix; $\vec{h}_i$ and $\vec{h}_j$ are the key features of nodes i and j, respectively.

The normalized exponential function (softmax) and LeakyReLU activation function are used to process the attention coefficient $e_{ij}$, and the expression of the processed attention coefficient $a_{ij}$ is:

$$a_{ij} = softmax_j(e_{ij}) = \frac{\exp(e_{ij})}{\sum_{k \in N_i} \exp(e_{ik})} = \frac{\exp\left(LeakyReLU\left(\vec{a}^T\left[W\vec{h}_i \| W\vec{h}_j\right]\right)\right)}{\sum_{k \in N_i} \exp\left(LeakyReLU\left(\vec{a}^T\left[W\vec{h}_i \| W\vec{h}_j\right]\right)\right)}$$

where $N_i$ is the number of other nodes in the sub-region corresponding to node i; k=1,2 . . . , $N_i$; exp(·) is an exponential symbol; and $\vec{a}^T$ is the transposition of the weight vector of feedforward neural network a.

A new feature h' of the node is obtained according to the calculated attention coefficient $e_{ij}$;

$$\vec{h}_i' = \sigma\left(\frac{1}{K}\sum_{b=1}^{K}\sum_{j \in N_i} a_{ij}^b W^b \vec{h}_j\right)$$

where σ is the activation function; K is the number of groups of attention mechanism; b=1,2 . . . , K.

The newly generated node feature h'={$\vec{h}_1, \vec{h}_2, \ldots, \vec{h}_s$} is input into the linear layer of GAT for prediction, and the predicted generated power of the power stations in the sub-region is obtained. The predicted generated power is compared with the actual generated power, and the power station with the smallest error is selected as the representative power station in this sub-region.

Step 4-2, building a stacked integrated model.

The stacked integrated model improves the overall prediction performance by combining multiple basic models. The main idea is to take the predicting results of the basic model as the input features, and then use another meta-model to make the final prediction. The algorithm can effectively combine the advantages of multiple models. By combining the predicting results of several basic models, the stacked integrated model is capable of better adapting to new and unknown data. This generalization ability makes the model show higher prediction ability and more reliability when facing different sub-regional photovoltaic power generation scenarios. At the same time, the algorithm may be easily extended to more basic models, and adjusted and improved as needed to make it more scalable and flexible.

Step 4-2-1, building a basic model for predicting the total generated power of the sub-regions.

As shown in FIG. 2, FIG. 3, FIG. 4 and FIG. 5, the CNN-LSTM-Multi-Head-Attention parallel multi-channel model is adopted as the basic model, and the historical generated power and key parameters of the representative power station in the sub-regions are used as the input of the basic model, and the output of the basic model is the total generated power in the future sub-region. CNN extracts spatial features from the data, while LSTM may selectively remember and forget past information by using memory units and gating mechanism, which enables the model to better capture the long-term patterns and trends in the total power data of the sub-regions, and there may be spatial correlation between the total power data of the sub-regions and the data of the representing power station, and the power values of the adjacent sub-regions may be similar or related. Through the recursive structure, LSTM model is capable of dealing with time sequence and spatial correlation at the same time, so that the correlation between sub-regions may be used more effectively for prediction. Through the multi-head-attention mechanism, the outputs of CNN and LSTM models are combined. The multi-head-attention mechanism is capable of weighting and fusing different feature subspaces, so that the model may pay more attention to important features and space-time relations. The output of multi-head-attention mechanism is mapped to the final predicting result through the fully connected layer. The fully connected layer may combine and transform the features, and transform the advanced features extracted by the multi-head-attention mechanism into the final predicted output, that is, the predicted total power of the sub-regions. This structure has strong expressive ability, may adapt to complex power station data patterns, and output accurate predicting results. This mechanism enhances the model ability to perceive key features in power station data, and improves the accuracy and robustness of prediction.

The feature extraction function of CNN also plays an important role in time sequence data. The time sequence data usually contain complex patterns and structures, and the spatial features between data may be captured more quickly and conveniently through the layer-by-layer stacking convolution operation of CNN. Meanwhile, a certain moment in time sequence data is usually related to its nearby moments. Convolution operation may capture local dependence when processing time sequence data, and by defining an appropriate convolution kernel size, local patterns and pattern evolution in time sequence data is capable of being effectively captured. By using convolution kernels of different sizes or multi-layer convolution, CNN is capable of realizing multi-scale representation of the time sequence data. Smaller convolution kernels may capture detailed features, while larger convolution kernels may capture more macroscopic trend features. Multi-layer convolution may gradually extract the abstract features of the time sequence data, thus realizing the modeling of different levels of time scales. CNN convolution operation formula is:

$$Y[n] = \sum_{w=0}^{k_0-1} X[n+w] \cdot W[w]$$

where Y[i] is the output sequence during the convolution operation; $k_0$ is the convolution kernel size; w represents the offset when the pooled window slides in the input data; X[i] is the input data of the convolution operation; W is the weight of the convolution sum; and n is the sequence index.

The formula of pooling operation is:

$$Z[n] = \max_{w=0}^{P-1} Y[n \cdot s + w]$$

where Z[n] is the output sequence of the pooling operation; p is the pooled window size; and s is the stride of the pooled window.

LSTM stores and updates information through a memory unit. The unit includes a forgetting gate, an input gate and an output gate, and each gate has a learnable weight, which can decide whether to transmit or update information. The forgetting gate determines whether the previously stored memory is forgotten, the input gate determines how new information is integrated into the memory, and the output gate determines how much of the output memory is passed to the next time step. The key point of LSTM is that it may effectively update and retain long-term memory. Through the control of the forgetting gate and the input gate, LSTM may selectively forget or store information, so as to be more accurate in dealing with long-term dependence. This enables LSTM to capture important patterns and structures in time sequence data without being limited by gradient disappearance or explosion. Similar to CNN, LSTM may also gradually extract more abstract features by stacking multiple layers. Each layer of LSTM may capture different levels of time scales, from lower-level detailed features to higher-level abstract features. This multi-layer structure is helpful for LSTM to understand and model time sequence data more deeply. The formula for each state at moment t is as follows:

$$i_t = \sigma(W_i x_t + U_i h_{t-1} + b_i)$$

$$f_t = \sigma(W_f x_t + U_f h_{t-1} + b_f)$$

$$o_t = \sigma(W_o x_t + U_o h_{t-1} + b_o)$$

$$\tilde{c}_t = \tanh(W_c x_t + U_c h_{t-1})$$

$$c_t = f_t \odot c_{t-1} + i_t \odot \tilde{c}_t$$

$$h_t = o_t \odot \tanh(c_t)$$

where $i_t$, $f_t$, $c_t$, $o_t$ and $h_t$ are the states of the input gate, forgetting gate, memory unit, output gate and hidden layer at moment/respectively; čt is a candidate cell state; $W_i$, $W_f$, $W_o$ and We are the weight matrices of the input gate, forgetting gate, output gate and memory unit respectively; $U_i$, $U_f$, $U_o$ and $U_c$ are the weight matrices of the hidden layer; $b_i$, $b_f$ and $b_o$ are offset values; and $\odot$ is a logical operator.

The memory unit $c_t$ is updated through the forgetting gate and the input gate. The forgetting gate determines how much information of the memory unit $c_{t-1}$ at the last moment is kept, and the input gate determines how much new information $\tilde{C}_t$ is added to the state of the memory unit.

The outputs of the two networks are weighted and combined through the multi-head-attention mechanism to realize the deep integration of space-time information. In the multi-head-attention mechanism, each attention head has an independent weight distribution mechanism, which determines the degree of attention of each head to input. Each attention head will generate a weight coefficient vector, which is used to sum the inputs by weight to obtain the representation result of the head, so that multiple attention heads may learn different attention patterns in different feature subspaces and provide diversified information expression. The calculation formula of the multi-head-attention mechanism is as follows:

$$MultiHead(Q, K, V) = Concat(head_1, head_2, \ldots, head_h)W^O$$

$$head_i = Attention(QW_i^Q, KW_i^K, VW_i^V)$$

$$Attention(K, Q, V) = softmax\left(\frac{QK^T}{\sqrt{d_k}}\right)V$$

where Q, K, and V are query vector, key vector and value vector respectively; h is the number of heads; head; is the output of the i-th header; $W^o$ is the output transformation matrix; $w_i^Q$, $w_i^k$, $W_i^v$ are the query, key and value matrices of the i-th head, and $d_k$ is the dimension of the key vector; Attention(·) is the attention calculation function; and softmax is the normalization of similarity.

Step 4-2-2, build a meta-model to predict the total generated power in a large region.

The GRU network is adopted as the meta-model, and the predicting results of the basic model are input into the meta-model to predict the future total generated power of the large region. Compared with LSTM, GRU has fewer gating units, which may capture the rapid changes and short-term patterns in large region power data more effectively. At the same time, there may be great differences in large region due to geographical location, weather and other factors. GRU model is capable of better adapting to the differences between different regions, and quickly adapting to the changes in different regions. When predicting the power of a large region, the features and change patterns of different regions may be captured more accurately. In addition, GRU is capable of comprehensively considering the predicting results from sub-regions, weighing and adjusting according to the predicting results of sub-regions, and predicting the power of the whole large region, thus improving the accuracy of the whole large region. The calculation formula of the GRU network is as follows:

$$z_t = \sigma(W_z(h_{t-1}, x_t) + b_z)$$

$$r_t = \sigma(W_r(h_t, x_t) + b_r)$$

$$\tilde{h}_t = \tanh(r_t \odot h_{t-1})W_h + x_t W_n + b_g)$$

$$h_t = (1 - z_t) \odot h_{t-1} + z_t \odot \tilde{h}_t$$

where $z_t$ is the update gate; $r_t$ is the reset gate; $\tilde{h}_t$ is a candidate hidden state; $h_t$ is the final update state; σ is the activation function; $x_t$ is the input of the current time step; $h_t$ is the hidden state of the current time step; $b_z$, $b_r$ and $b_g$ are the offset values at the corresponding moment respectively; and $W_z$, $W_r$ and $W_h$ are weight parameters.

Step 5, training the model.

Step 5-1, using the training set to train the GAT.

Step 5-2, using the training set to train the two groups of models of the basic model in parallel, and respectively predicting the total power of the sub-regions after 1 h, 3 h and 5 h; and by combining the multi-head-attention mechanism, effectively integrating the feature representation learned by the two groups of models. The mutual improvement of expression level between CNN and LSTM is realized: CNN is good at extracting spatial features, while LSTM is good at capturing temporal evolution laws; through parallel training, CNN and LSTM may influence each other's learning optimization direction and give full play to the advantages of their respective network structures in space-time information extraction. The test set is input into the trained basic model to obtain the predicted total generated power of the sub-regions.

Step 5-3, combined with the predicted total generated power from the trained basic model, the training set and the test set, training the meta-model together.

Step 6, using the test set to test and predict the total generated power model in the large region.

The verification set is input into the GAT to predict the generated power of each of the power stations in the corresponding sub-region, the predicted generated power is compared with the actual generated power, and the power station with the smallest error is selected as the representative power station in the sub-regions. Taking the historical generated power and key features of the representative power station in the sub-regions as the input of the basic model, the predicted total generated power in the sub-regions in the future is output. The output results of multiple basic models are regarded as the new features of the input data of the meta-model, and the features and space-time features of each of the sub-regions are brought into the consideration of the meta-model, so as to further synthesize and integrate the outputs of different sub-regions, and better predict the total generated power in large region.

Taking the average absolute error (MAE) as the evaluation index of the predicting results, the predicting results of the model of the disclosure, CNN-LSTM-multi-head-attention and BiLSTM-CNN in different seasons and time scales are evaluated respectively. The calculation formula of MAE is as follows:

$$MAE = \frac{1}{m}\sum_{i=1}^{m}|(y_i - \hat{y}_i)|$$

where m is the number of samples; $y_i$ is the true value; $\hat{y}_i$ is the predicted value.

Figure 6:
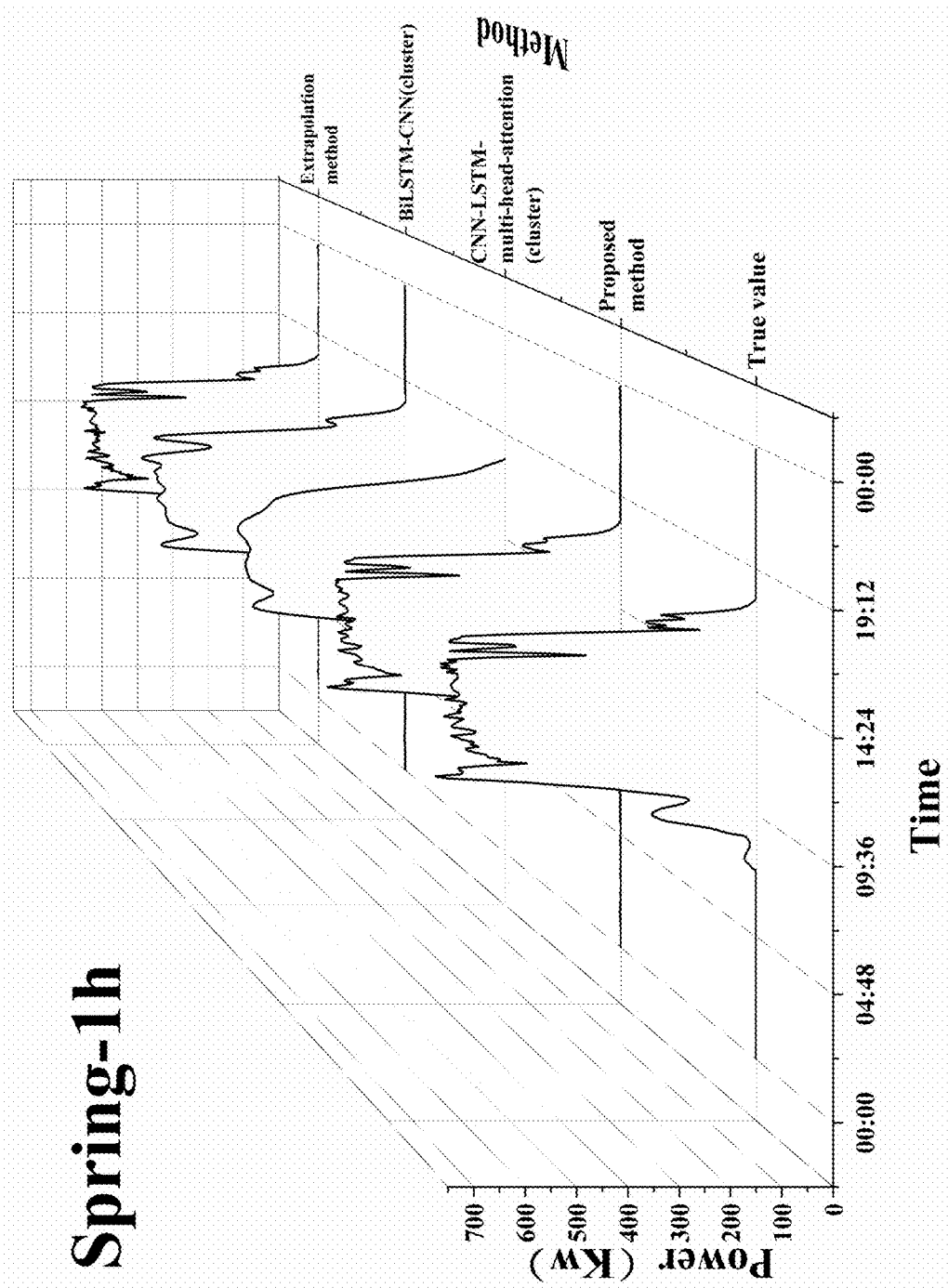
FIG. 6 is a comparison chart of spring-1$h$ predicting results in a large region.

It can be seen from FIG. 6 that both the method proposed in this embodiment and other classical models and traditional methods are capable of capturing the trend of photovoltaic generated power. This shows that they may provide a certain degree of prediction accuracy in general. Under extreme weather conditions, the fluctuation of photovoltaic generated power is extremely obvious. Compared with other methods, the method proposed in this embodiment is capable of capturing the detailed features of data more accurately and show better fitting effect at the curve turning point. This means that this method may more accurately predict the change of photovoltaic power at different time points and capture the turning point of power curve. The data in Table 1 also directly proves the effectiveness and feasibility of the model in the disclosure. When the parameters, neural network layers and training times of the model are basically the same, the model in this embodiment is not only better than other models in R2, MAE and RMSE, but also uses less time than other models. BILSTM-CNN (cluster) and CNN-LSTM CNN-LSTM-Multi-Head-Attention (cluster) both have good performance in predicting a single photovoltaic power station, but they may not achieve good results in predicting power is the large region as meta-models, which also reflects from the side that the selection of the basic model and the meta-model may not be based on previous experience, and the adaptability between the basic model and the meta-model may be considered. If there is a mismatch or disharmony between the basic model and the meta-model, the prediction accuracy will decrease. In addition, compared with the extrapolation method, the method proposed in this embodiment has higher accuracy.

TABLE 1

| Models | R2 | MAE | RMSE | Average computing time |
|---|---|---|---|---|
| Model in this embodiment | 0.9995 | 3.9095 | 6.4404 | 47.45 |
| BILSTM-CNN (cluster) | 0.9934 | 12.5223 | 23.0723 | 435.65 |
| CNN-LSTM-Multi-Head-Attention (cluster) | 0.9916 | 13.471 | 26.0175 | 85.35 |
| Extrapolation method | 0.9991 | 5.5047 | 7.8745 | / |

In the process of selecting the basic model, the model in this embodiment is compared with CNN-GRU-Multi-Head-Attention (parallel) model and CNN-BILSTM-Multi-Head-Attention (parallel) model to predict the generated power in region A in spring after one hour. Detailed experimental data are shown in Table 2:

TABLE 2

| Models | R2 | MAE | RMSE |
|---|---|---|---|
| CNN-GRU-Multi-Head-Attention (parallel) | 0.9973 | 0.7361 | 1.332 |
| CNN-LSTM-Multi-Head-Attention (parallel) | 0.9985 | 0.5607 | 0.9965 |
| CNN-BIL STM-Multi-Head-Attention (parallel) | 0.9984 | 0.5621 | 1.0134 |

From the experimental data in the table, it can be seen that the basic model proposed in the embodiment is obviously better than the other two models in R2, MAE and RMSE. From the R2 index, it can be seen that the fitting degree of the model in the embodiment is better than the other two models, which also proves from the side that the MAE and RMSE of this model are smaller than the other two models, and the prediction accuracy is higher than the other two models.

What is claimed is:

1. A method for predicting distributed regional generated power based on a stacked integrated model, comprising the following steps:
    step 1, by a processor, dividing a predicted region into a plurality of sub-regions; using historical data of power stations in the predicted region as a data set; the historical data comprises a generated power x of each of the power stations, a total generated power of the sub-regions, a total generated power of the predicted region and a plurality of influence features H;
    step 2, according to a degree of correlation with power output, selecting one or more key features h from the influence features H, by the processor;
    step 3, by the processor, performing a normalization processing on the generated power x of the power stations, the total generated power of the sub-regions, the total generated power of the predicted region and the one or more key features h; dividing the data set after the normalization processing into a training set and a test set;
    step 4, building the stacked integrated model by the processor;
    the stacked integrated model comprises a basic model and a meta-model; the basic model takes key features of a representative power station as input, extracts features through Convolutional Neural Network, (CNN) network and Long Short-Term Memory, (LSTM) network respectively, and weights and fuses output features of the CNN network and the LSTM network by using a multi-head-attention mechanism; advanced features extracted by the multi-head-attention mechanism are transformed into a predicted total power of the sub-regions of a final predicted output through a fully connected layer; the meta-model is a Gated Recurrent Unit, (GRU) network; the meta-model takes a predicted total power of each of the sub-regions output by the basic model as input, and a predicted value of a predicted total power of the predicted region as output;

step 5, by the processor, training the basic model by using the training set, and inputting the test set into a trained basic model to output and obtain a predicted total generated power of the sub-regions; combined jointly training the meta-model using the training set and the test set;

step 6, by the processor, selecting a distinct representative power station for each of the corresponding sub-regions and obtaining corresponding historical generated power and key parameters; inputting the historical generated power and the key parameters of into the basic model to predict a future total generated power of the sub-regions, and inputting a predicted future total generated power of all the sub-regions into the meta-model to predict a future total generated power of the predicted region;

wherein the selecting a distinct representative power station for each of the corresponding sub-regions comprises: constructing a graph attention network, (GAT) for each of the sub-regions, and predicting generated power of the power stations of the sub-regions in corresponding time period by inputting the key parameters; comparing the predicted generated power with an actual generated power, and taking a corresponding power station with a smallest error as the representative power station in the sub-region.

2. The method for predicting the distributed regional generated power based on the stacked integrated model according to claim 1, wherein in the step 1, the influence features H comprises a plurality of features among wind speed, atmospheric temperature, irradiance, wind direction, maximum wind speed, air pressure, temperature of a first probe and temperature of a second probe.

3. The method for predicting the distributed regional generated power based on the stacked integrated model according to claim 1, wherein in the step 1, the processor identifies and removes abnormal values in the data set by 3-sigma criterion; after removing the abnormal values from the data set, Hermite interpolation method is used to estimate reasonable values at positions corresponding to the abnormal values based on normal values and corresponding derivative information.

4. The method for predicting the distributed regional generated power based on the stacked integrated model according to claim 1, wherein in the step 2, the selecting the one or more key features by the processor comprises:

the processor uses MIC correlation coefficient and Pearson correlation coefficient to select features respectively; the MIC correlation coefficient is calculated as follows:

$$MIC_{(x,H)} = \max_{e*f<D} \frac{I(x, H)}{\min(e, f)}$$

wherein MIC(x,H) is a maximum information coefficient; I(x,H) is mutual information of power x and influence features H; e and f are rows and columns dividing grids respectively; D is a constant, and a value of D is set to 0.6 power of the number of the power stations in the data set;

a correlation calculation formula of the Pearson correlation coefficient is as follows:

$$\rho_{x,H} = \frac{\text{cov}(x, H)}{\sigma_x \sigma_H}$$

wherein $p_{x,H}$ is the Pearson correlation coefficient; cov(x, H) is a covariance of the power x and the influence features H; σx and σH are standard deviations of the power x and the influence features H, respectively; and according to calculated Pearson correlation coefficient $p_{x,H}$ and the maximum information coefficient MIC(x, H), selecting the one or more key features h by the processor.

5. The method for predicting the distributed regional generated power based on the stacked integrated model according to claim 4, wherein the selecting the one or more key features h comprises:

the processor selects influence features corresponding to the Pearson correlation coefficient $p_{x,H}$ being greater than 0.4 and the maximum information coefficient MIC(x,H) being greater than 0.1 as the one or more key features h.

6. The method for predicting the distributed regional generated power based on the stacked integrated model according to claim 1, wherein in the step 6, the processor predicts a generated power of the predicted region in the next 1 hour to 5 hours.

7. The method for predicting the distributed regional generated power based on the stacked integrated model according to claim 1, wherein in the step 3, after normalization, the processor divides the data set into four seasons: spring, summer, autumn and winter, and a corresponding model is obtained through training.

8. A computer device, comprising a memory, a processor and a computer program stored in the memory and executable on the processor, wherein the processor executes the method for predicting the distributed regional generated power based on the stacked integrated model according to claim 1.

9. A non-transitory readable storage medium, wherein a computer program is stored; and when executed by a processor, the computer program is used to realize the method for predicting the distributed regional generated power based on the stacked integrated model according to claim 1.

* * * * *